Figure 1:
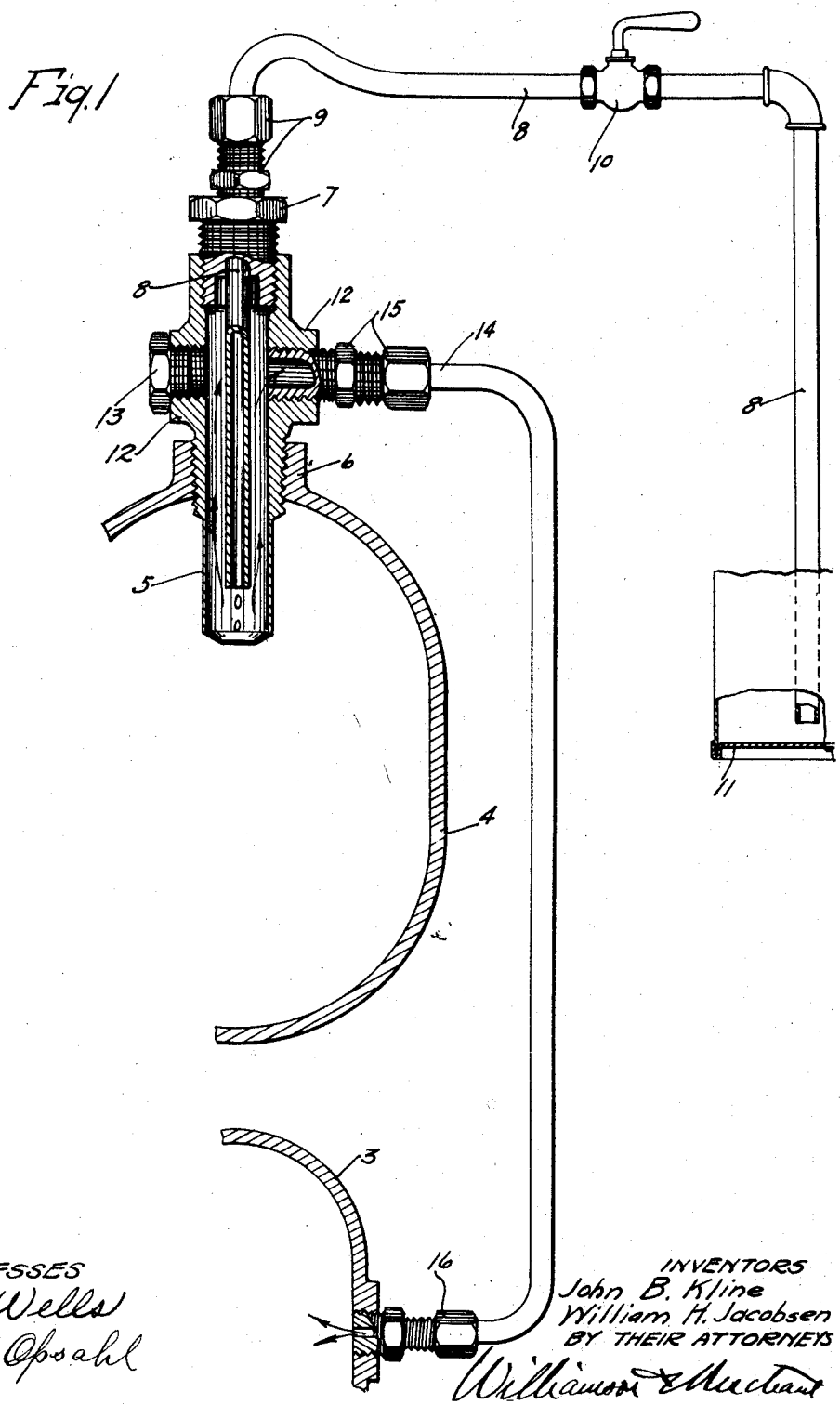

J. B. KLINE AND W. H. JACOBSEN.
VAPORIZER FOR INTERNAL COMBUSTION ENGINES.
APPLICATION FILED FEB. 9, 1918.

1,316,960.

Patented Sept. 23, 1919.

2 SHEETS—SHEET 1.

J. B. KLINE AND W. H. JACOBSEN.
VAPORIZER FOR INTERNAL COMBUSTION ENGINES.
APPLICATION FILED FEB. 9, 1918.
1,316,960. Patented Sept. 23, 1919.
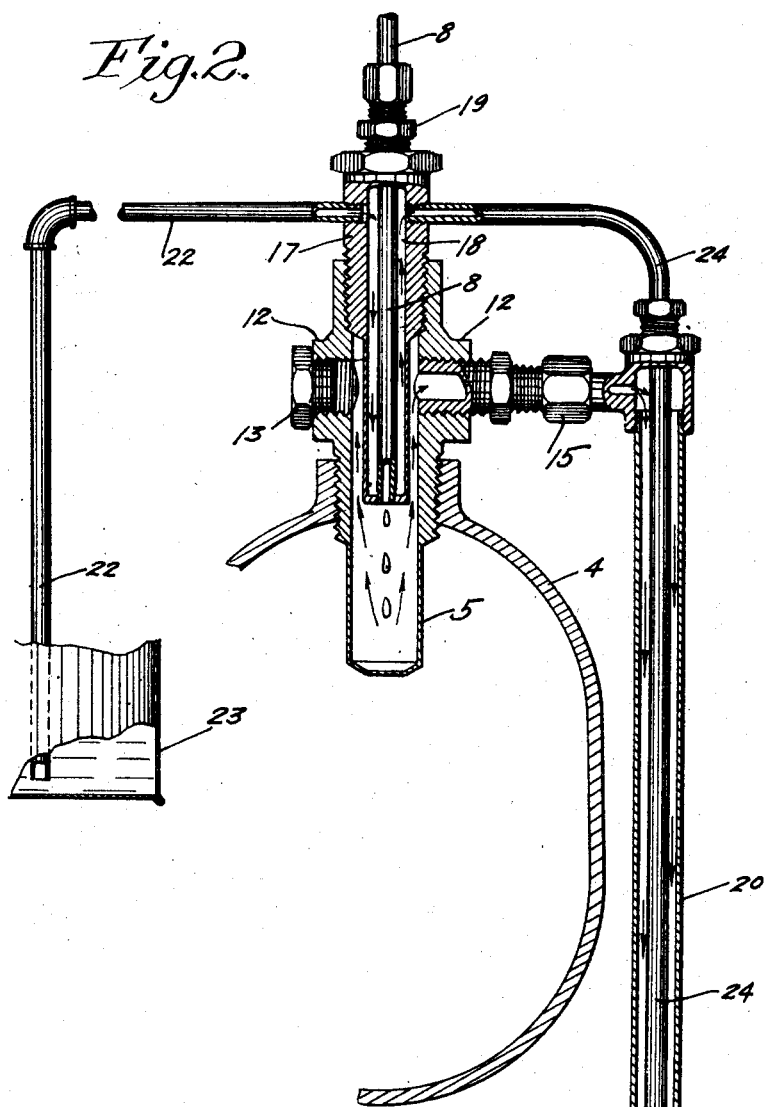
Fig.2.
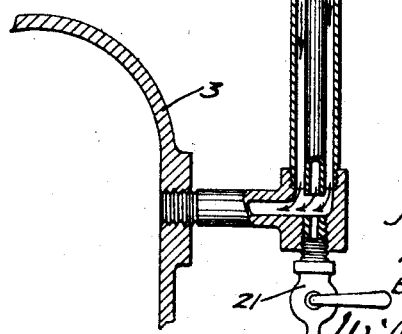
WITNESSES
E. C. Wells
A. H. Opsahl
INVENTORS
John B. Kline
William H. Jacobsen
BY THEIR ATTORNEYS
Williamson Merchant

UNITED STATES PATENT OFFICE.

JOHN B. KLINE AND WILLIAM H. JACOBSEN, OF MINNEAPOLIS, MINNESOTA.

VAPORIZER FOR INTERNAL-COMBUSTION ENGINES.

1,316,960. Specification of Letters Patent. Patented Sept. 23, 1919.

Application filed February 9, 1918. Serial No. 216,409.

*To all whom it may concern:*

Be it known that we, JOHN B. KLINE, and WILLIAM H. JACOBSEN, citizens of the United States, residing at Minneapolis, in the county of Hennepin and State of Minnesota, have invented certain new and useful Improvements in Vaporizers for Internal-Combustion Engines; and we do hereby declare the following to be a full, clear, and exact description of the invention, such as will enable others skilled in the art to which it appertains to make and use the same.

Our invention relates to vaporizers for internal combustion engines; and, to this end, it consists of the novel devices and combinations of devices hereinafter described and defined in the claim.

One of the main features of the invention is to provide a flash tube exposed to the heat produced by the combustion of an internal combustion engine and into which flash tube, water is dripped from a valve controlled conduit leading from a suitable water supply, whereby, a predetermined and constant supply of vapor or steam is produced and delivered to the intake manifold of the engine to increase the efficiency of the fuel charge, reduce the temperature of the combustion chambers, eliminate and prevent carbon deposits and assist in lubrication.

A further feature of the invention is to provide, in connection with the flash tube, a vaporizer for producing an auxiliary fuel supply from kerosene or other heavy hydrocarbon fuel and deliver the same to the intake manifold with the hydro-vapor.

A further feature of the invention is to superheat the hydro-carbon vapor, produced in the vaporizer, in its passage from said vaporizer to the intake manifold and further vaporize the same and also prevent condensation.

A still further feature is to deliver water to the flash tube, and liquid to the vaporizer under the suction stroke of the engine, whereby both the water and fuel are automatically controlled, and when the engine is stopped will be automatically cut off to prevent flooding.

To the above end, generally stated, the invention consists of the novel devices and combinations of devices hereinafter described and defined in the claim.

In the accompanying drawings, which illustrate the invention, like characters indicate like parts throughout the several views.

Referring to the drawings:

Figure 1 is a view, partly in side elevation and partly in section, illustrating the invention designed as a hydro-vaporizer and applied to the exhaust manifold and intake manifold of an internal combustion engine; and Fig. 2 is a view corresponding to Fig. 1, with the exception that an auxiliary hydrocarbon vaporizer is incorporated in the hydro-vaporizer.

Referring first to the invention, as illustrated in Fig. 1, the numerals 3 and 4 indicate, respectively, the intake manifold and the exhaust manifold of an internal combustion engine. A vertically disposed flash tube 5 has screw-threaded engagement, at its intermediate portion, with an internally threaded boss 6 on the upper side of the exhaust manifold 4. This flash tube 5 extends transversely into the exhaust manifold 4 so that its lower end portion, which is closed by a saucer-like bottom, is exposed directly to the heat from the burnt gases passing through said exhaust manifold.

Screwed into the upper end of the flash tube 5, is a bushing 7, through which a water delivery pipe 8 extends axially into the flash tube 5. The delivery end of this pipe 8 terminates above the bottom of the flash tube 5 and is secured to the bushing 7 by a connector 9, which affords a tight joint therewith. A valve 10 is interposed in the water pipe 8 for controlling the water supply, so that the same may be constantly dripped onto the bottom of the flash tube 5 in a predetermined quantity. The pipe 8 leads from a suitable water supply in a tank 11, located in any convenient position and preferably below the flash tube 5. The diameter of the pipe 8 is considerably less than the internal diameter of the flash tube 5 and the vapor rising in said flash tube affords a jacket for the delivery end portion of said pipe and pre-heats the water as the same is dripped therethrough.

Formed with the flash tube 5, is a pair of diametrically opposite bosses 12 having internal screw threads and tap the chamber in the flash tube 5 near its upper extremity. One of these bosses 12 is closed by a plug 13 and the receiving end of a hydro-vapor pipe 14 is secured to the other of said bosses by a connector 15, and the other or delivery end of the hydro-vapor pipe 14 is joined to the intake manifold 3 by a connector 16 which affords communication therebetween. The lower end of the flash tube 5, which projects into the exhaust manifold 4, will, of course, become very hot and, as the drops of water from the pipe 8 strike the saucer-like bottom thereof they will be instantly converted into vapor or steam, which rises in the flash tube 5, around the delivery end portion of the water pipe 8 and forms the jacket therearound, as heretofore mentioned. This vapor or steam is drawn into the intake manifold, under the suction stroke of the engine. As the tank 11 is located below the bottom of the flash tube 5, the water therein will be delivered to said flash tube under the suction stroke of the engine. It will thus be seen that the water supply to the flash tube is automatically controlled by the engine, and as soon as the engine stops, the water supply will be cut off, thus preventing flooding.

By dripping the water onto the bottom of the flash tube the same is instantly converted into vapor which is drawn into the intake manifold in a predetermined and constant quantity. This vapor supply becomes available substantially with the starting of the engine for the reason that the flash tube is heated sufficiently, after a few explosions, to convert the drops of water into vapor. Obviously, this method of obtaining hydro-vapor is much more effective than allowing the flash tube to fill with water, as it would then take considerable heat before vaporization would take place, and, further, the supply of hydro-vapor to the intake manifold could not be so easily controlled.

Referring now to the invention as shown in Fig. 2, the flash tube 5 is the same as shown in Fig. 1, with the exception that the bushing 7 is removed and a hydro-carbon vaporizer 17 substituted therefor. This vaporizer 17 is of substantially the same form as the flash tube 5 and affords a chamber 18, then extends axially into said flash tube and terminates considerably above the bottom thereof. The diameter of the lower extremity of vaporizer 17 is considerably less than the internal diameter of the flash tube 5 and the vapor rising therein will form a jacket around said vaporizer and then escape through the connector 15.

The water pipe 8 extends axially through the chamber 18, from the top thereof, and its delivery end has screw threaded engagement with the bottom of the vaporizer 17. A connector 19 in the top of the vaporizer 17 affords a tight joint between said vaporizer and the pipe 8. Hydro-vapor produced in the flash tube 5 is drawn into the intake manifold 3 through the connector 15 and a relatively large pipe 20, having at its lower extremity a drain cock 21. Kerosene or other heavy hydro-carbon fuel is drawn into the chamber 18 under the suction stroke of the engine through a pipe 22 leading from a tank 23. This tank 23, like the tank 11, is preferably located below at the lower end of the vaporizer 17 so that the kerosene supply to the vaporizer is automatically controlled and will be cut off when the engine is stopped, to prevent flooding.

Heat transmitted to the vaporizer 17 through the flash tube 5 and vapor jacket surrounding said vaporizer will vaporize the kerosene and the vapor therefrom will be conveyed to the delivery end of the pipe 20 through a relatively small pipe 24. This pipe extends axially through the pipe 20 from the top thereof and is jacketed by the hydro-vapor in the pipe 20. This hydro-vapor in the pipe 20 superheats the hydro-carbon vapor in the pipe 24 in its passage from the vaporizer 17 to the intake manifold 3. By superheating the hydro-carbon vapor condensation is prevented and said vapor is further vaporized before it comingles with the hydro-vapor at the delivery end of the pipe 24 and before entering the intake manifold.

What we claim is:—

The combination with the intake and exhaust conduits of an internal combustion engine, of a hydro-vaporizer comprising a depending flash tube extending into the exhaust conduit, a receptacle for holding a water supply, a water conduit leading from the receptacle with its delivery end extending into the flash tube from the top thereof and terminating above the bottom thereof, whereby water may be dripped from the water tube onto the hot bottom of the flash tube to immediately vaporize the same, a hydro-vapor conduit leading from the flash tube, above the delivery end of the water conduit, to the intake conduit, an auxiliary hydro-carbon vaporizer comprising a chamber in the flash tube, spaced apart therefrom and surrounding the water conduit, a conduit for conveying a liquid fuel to said chamber, and a conduit for conveying the hydro-carbon vapor from said chamber to the intake conduit.

In testimony whereof we affix our signatures in presence of two witnesses.

JOHN B. KLINE.
WILLIAM H. JACOBSEN.

Witnesses:
EVA E. KÖNIG,
HARRY D. KILGORE.